US007917800B2

(12) United States Patent
Cohn et al.

(10) Patent No.: US 7,917,800 B2
(45) Date of Patent: Mar. 29, 2011

(54) USING DEVICE STATUS INFORMATION TO TAKEOVER CONTROL OF DEVICES ASSIGNED TO A NODE

(75) Inventors: Jeremy Andrew Cohn, Tucson, AZ (US); David Ray Kahler, Tucson, AZ (US); Karl Allen Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/144,582

(22) Filed: Jun. 23, 2008

(65) Prior Publication Data

US 2009/0319700 A1    Dec. 24, 2009

(51) Int. Cl.
    *G06F 11/00*    (2006.01)
(52) U.S. Cl. .............................................. 714/4; 714/11
(58) Field of Classification Search .................. 714/4, 11
    See application file for complete search history.

(56) References Cited

U.S. PATENT DOCUMENTS

| 5,790,775 | A  | * | 8/1998  | Marks et al. ........................ 714/9 |
| 6,775,278 | B1 |   | 8/2004  | Britton et al. |
| 6,920,580 | B1 | * | 7/2005  | Cramer et al. ..................... 714/4 |
| 7,318,116 | B2 |   | 1/2008  | Gallo et al. |
| 7,634,683 | B2 | * | 12/2009 | De La Cruz et al. .............. 714/4 |
| 7,739,543 | B1 | * | 6/2010  | Pittman et al. .................... 714/7 |
| 2002/0095489 | A1 | * | 7/2002 | Yamagami ..................... 709/224 |
| 2004/0139196 | A1 | * | 7/2004 | Butler et al. .................. 709/225 |
| 2005/0010837 | A1 |   | 1/2005  | Gallagher et al. |
| 2005/0097394 | A1 | * | 5/2005  | Wang et al. ...................... 714/11 |
| 2005/0172161 | A1 | * | 8/2005  | Cruz et al. ........................ 714/4 |
| 2006/0259619 | A1 |   | 11/2006 | Chang et al. |
| 2007/0168693 | A1 | * | 7/2007  | Pittman ............................ 714/4 |
| 2008/0133963 | A1 | * | 6/2008  | Katano et al. ..................... 714/4 |

OTHER PUBLICATIONS

U.S. Patent Application entitled "Apparatus, System, and Method for Implementing Failover in a Polling Adapter without Support from an Application Server", U.S. Appl. No. 11/846,440, filed Aug. 28, 2007, by inventors T.E. Nelson and S.Vidyarthi.
D. Sinclair, "Load Balancing of Destage Operations in a N Way, Write Cache, Disk Subsystem", IBM Technical Disclosure Bulletin, IP.com No. IPCOM000014097D, Mar. 1, 2001, pp. 1-5.

* cited by examiner

*Primary Examiner* — Marc Duncan
(74) *Attorney, Agent, or Firm* — David W. Victor; Konrad Raynes & Victor LLP

(57) ABSTRACT

Provided are a method, system, and article of manufacture for using device status information to takeover control of devices assigned to a node. A first processing unit communicates with a second processing unit. The first processing unit uses a first device accessible to both the first and second processing units and the second processing unit uses a second device accessible to both the first and second processing units. The first processing unit receives status on the second device from the first device indicating whether the second device is available or unavailable. The first processing unit detects a failure of the second processing unit and determines from the received status on the second device whether the first device is available in response to detecting the failure of the second processing unit. The first processing unit configures the second device for use by the first processing unit in response to determining that the received status on the second device indicates that the second device is available and in response to detecting the failure.

20 Claims, 5 Drawing Sheets

Node Device Status Entry

Inquiry Device Status Entry

USING DEVICE STATUS INFORMATION TO TAKEOVER CONTROL OF DEVICES ASSIGNED TO A NODE

BACKGROUND OF THE INVENTION

1. Field of the Invention

The present invention relates to a method, system, and article of manufacture for using device status information to takeover control of devices assigned to a node.

2. Description of the Related Art

Processing units in a system may share multiple adapters that enable communication with one or more storage systems. The processing units may communicate with the adapters via one or more networks. If one of the processing units fails, a surviving processing unit may take over the adapter assigned/owned by the failing processor. If the takeover occurred while an adapter owned by the surviving processing unit failed, then the takeover would allow the processing unit to maintain connectivity to an adapter and the connected storage system to maintain continued access to the storage systems accessible through the adapters.

The surviving processing unit needs to determine the status of the adapters assigned to the failed/failing processing unit to determine whether it may be taken over. In certain configurations, the surviving system may not be able to directly query the adapter assigned to the failing processing unit to determine the status because only the assigned/owner processing unit, i.e., the failing processing unit, can communicate with the adapter. In such case, the surviving processor may nonetheless try to takeover the adapter owned by the failing processing unit without querying the adapter to takeover to determine whether it is in fact available.

There is a need in the art for improved techniques to handle a takeover of a device or adapter assigned to a failed or failing node.

SUMMARY

Provided are a method, system, and article of manufacture for using device status information to takeover control of devices assigned to a node. A first processing unit communicates with a second processing unit. The first processing unit uses a first device accessible to both the first and second processing units and the second processing unit uses a second device accessible to both the first and second processing units. The first processing unit receives status on the second device from the first device indicating whether the second device is available or unavailable. The first processing unit detects a failure of the second processing unit and determines from the received status on the second device whether the second device is available in response to detecting the failure of the second processing unit. The first processing unit configures the second device for use by the first processing unit in response to determining that the received status on the second device indicates that the second device is available and in response to detecting the failure.

DETAILED DESCRIPTION

Figure 1:
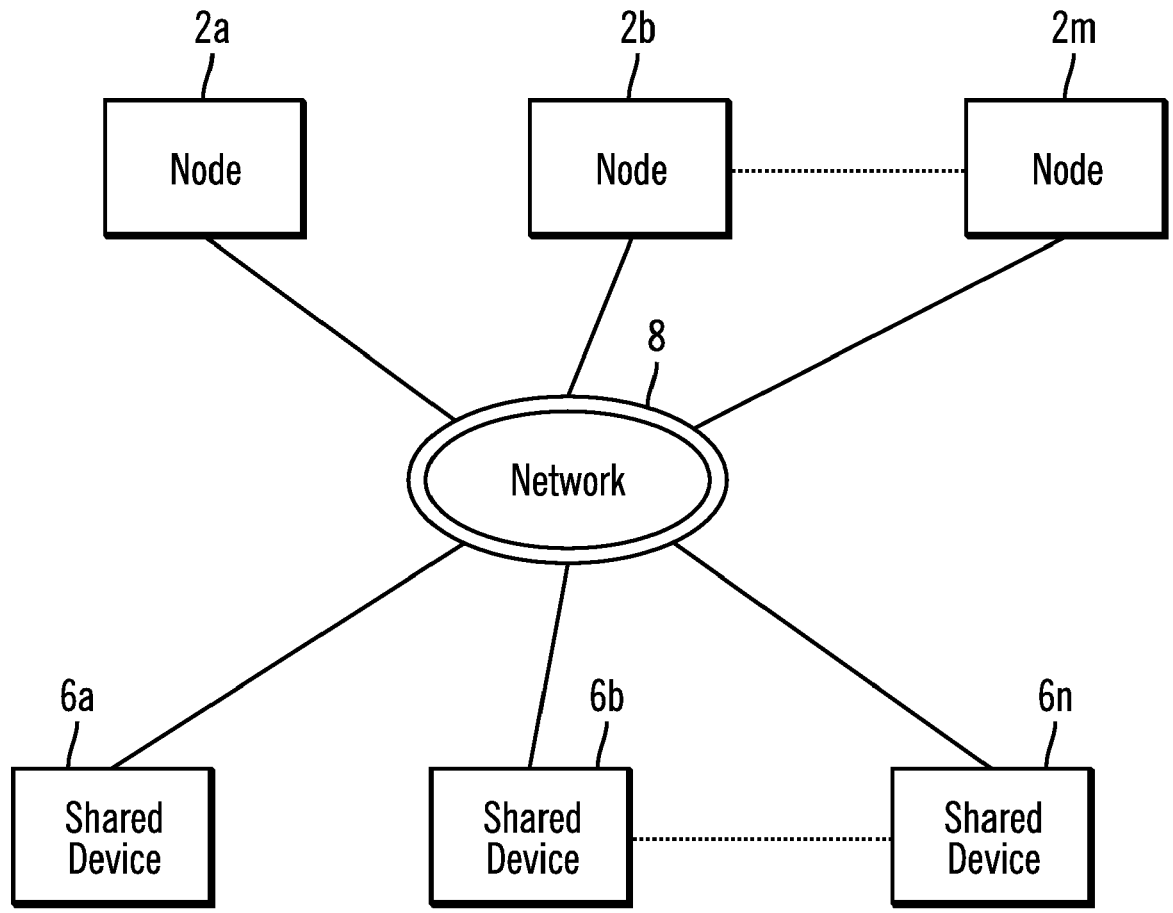
FIG. 1 illustrates an embodiment of a computing environment.

FIG. 1 illustrates an embodiment of a network computing environment. A plurality of computational nodes $2a$, $2b$ . . . $2m$ communicate with shared devices $6a$, $6b$ . . . $6n$ over a network 8. The network 8 may comprise a single common network or multiple unconnected networks. The network may comprise a loop network, such as a Fibre Channel Arbitrated Loop, an Ethernet network, etc. Alternatively, the network 8 may comprise one or more computer busses or other suitable interfaces known in the art. The nodes $2a$, $2b$ . . . $2m$ may comprise computational devices that process Input/Output (I/O) requests or perform other operations and communicate with shared devices $6a$, $6b$ . . . $6n$. The nodes $2a$, $2b$ . . . $2m$ may be housed within separate systems or housed in a same computer box or housing. The shared devices $6a$, $6b$ . . . $6n$ may comprise storage devices, computational resources, e.g., a database, content library, printer, telecommunication device, network router, etc.

Figure 2:
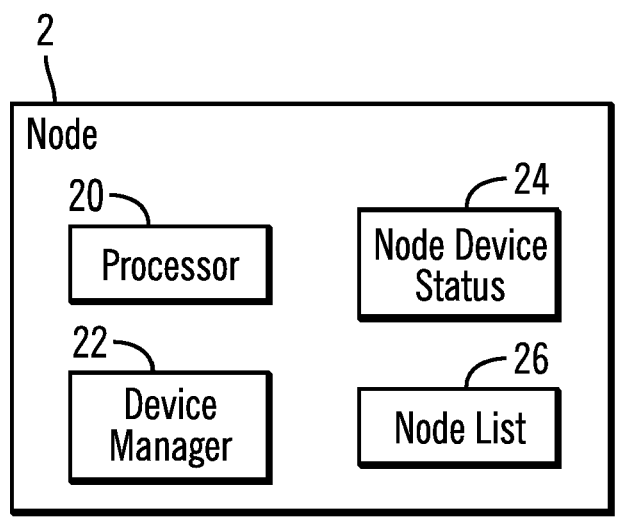
FIG. 2 illustrates an embodiment of node components.

FIG. 2 illustrates an embodiment of components of a node 2, which may comprise the nodes $2a$, $2b$ . . . $2m$. The node 2 includes a processor 20 and a device manager 22, such as a device driver, to perform management operations with respect to the shared devices $6a$, $6b$ . . . $6n$. The device manager 22 maintains node device status 24 indicating the availability status of each of the shared devices $6a$, $6b$ . . . $6n$, including devices owned by the node 2 and devices owned by other nodes $2a$, $2b$ . . . $2m$. The node list 26 comprises the network address and information on nodes $2a$, $2b$ . . . $2m$ that access the shared devices $6a$, $6b$ . . . $6n$ and that may be assigned as owners of the shared devices $6a$. $6b$ . . . $6n$. An owner node of a shared device manages access to that shared device $6a$, $6b$ . . . $6n$, such that other nodes must submit requests to access or use the shared device $6a$, $6b$ . . . $6n$ to the owner node.

Figure 3:
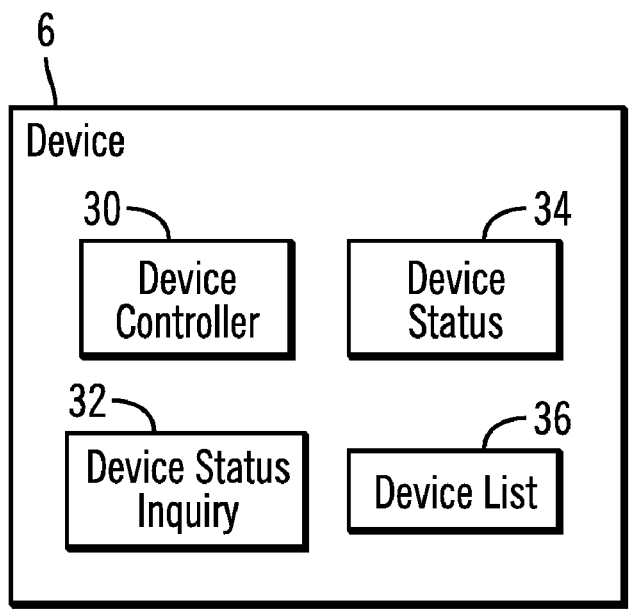
FIG. 3 illustrates an embodiment of device components.

FIG. 3 illustrates an embodiment of components of a device 6, which may comprise the devices $6a$, $6b$ . . . $6n$. The device 6 includes a device controller 30 to perform device related operations, device status inquiry 32 comprising code or a module that queries other devices on the network 8 to determine their status and store indication of their status in device status 34. A device list 36 identifies other devices $6a$, $6b$ . . . $6n$ on the network 8. The device status inquiry 32 may comprise code executed by the device controller 30 or may comprise hardware logic that is implemented separate from the device controller 30 or may be part of the device controller 30.

Figure 4:
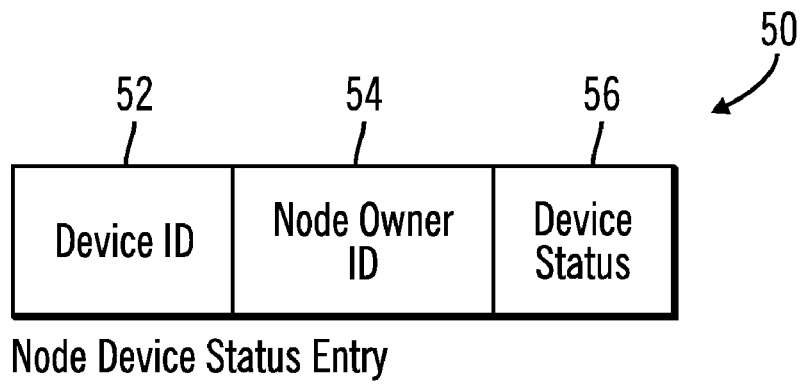
FIG. 4 illustrates an embodiment of a node device status entry.

FIG. 4 illustrates an embodiment of a node device status entry 50, which may comprise an instance or entry of the node device status 24 providing availability information for one shared device $6a$, $6b$ . . . $6n$. The node device status information entry 50 includes a shared device identifier (ID) 52 for which the status information is provided; a node owner ID 54 indicating the node $2a$, $2b$ . . . $2m$ that owns the identified shared device 52; and the device status 56, e.g., available, unavailable.

Figure 5:
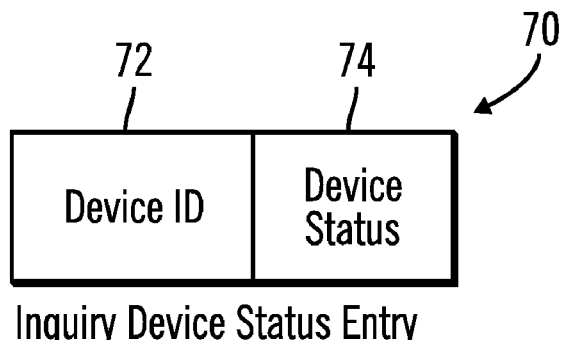
FIG. 5 illustrates an embodiment of an inquiry device status entry.

FIG. 5 illustrates an embodiment of an inquiry device status entry 70, which may comprise an instance or entry of the device status 34 maintained by the device 6 providing availability information for shared devices 6a, 6b . . . 6n on the network 8. The node device status information entry 70 includes a shared device identifier (ID) 72 for which the status information is provided and the device status 74, e.g., available, unavailable.

Figure 6:
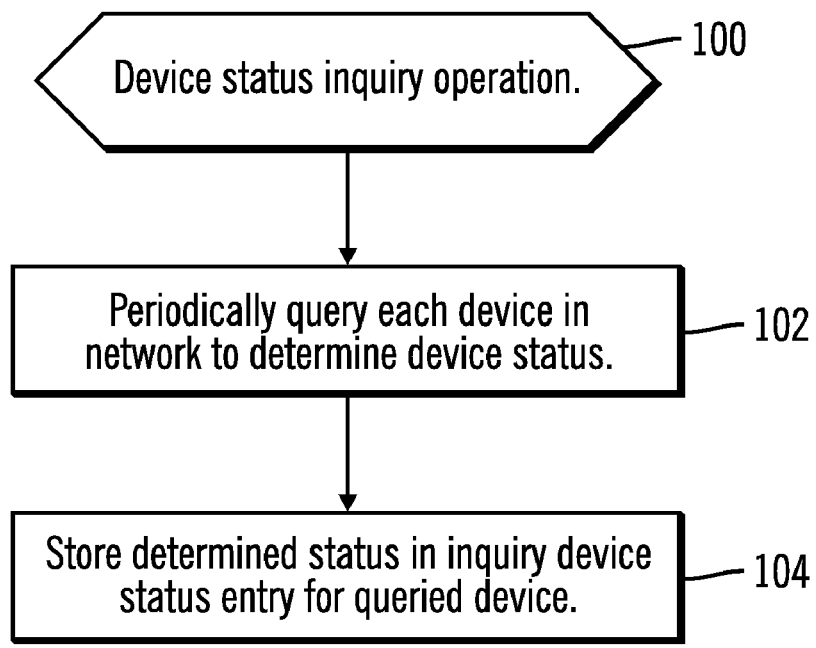
FIG. 6 illustrates an embodiment of device operations to perform a device status inquiry operation.

FIG. 6 illustrates an embodiment of operations performed by the device status inquiry 32. As part of a device query operation (at block 100), the device status inquiry 32 periodically queries (at block 102) each device 6a, 6b . . . 6n in the network 8, which may be identified in the device list 36, for status information. The device status inquiry 32 may store (at block 104) the determined status for all queried devices 6a, 6b . . . 6n in inquiry device status entries 70 for the queried devices 6a, 6b . . . 6n. If a queried device 6a, 6b . . . 6n does not respond, then the device status 74 for that device may be indicated as unavailable.

Figure 7:
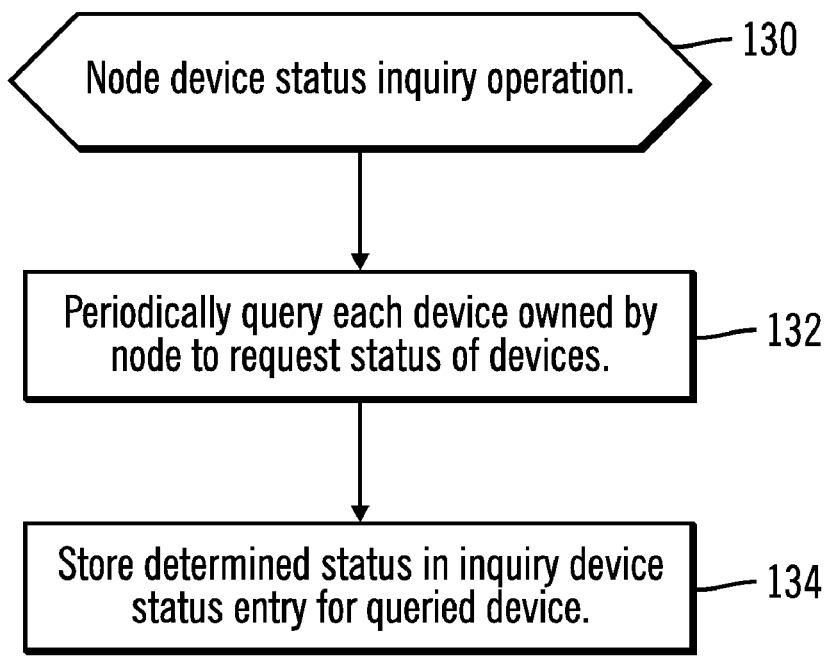
FIG. 7 illustrates an embodiment of node operations to obtain node device status information.

FIG. 7 illustrates an embodiment of operations performed by the device manager 22 in the node 2 to obtain device status information. As part of a device query operation (at block 130), the device manager 22 queries (at block 132) each device 6a, 6b . . . 6n owned by that node in the network 8 to determine the device status 34 information gathered by the queried device 6a, 6b . . . 6n. The device status 34 gathered from each owned queried device 6a, 6b . . . 6n includes status information for the devices 6a, 6b . . . 6n that the queried device 6a, 6b . . . 6n gathered per the operations of FIG. 6. The device manager 22 may store (at block 134) the determined device status 34 in the node device status entries 50 of the device status 34. If a queried device 6a, 6b . . . 6n does not respond to the query for device status, then the device manager 22 still maintains the device status information received in response to a previous query when the queried device 6a, 6b . . . 6n was available, and would use that previously received device status information to perform operations.

In an alternative embodiment, the devices 6a, 6b . . . 6n may push device status information to their owner node 2a, 2b . . . 2m, as opposed to the node 2a, 2b . . . 2m pulling the device status information from the shared devices 6a, 6b . . . 6n they own.

Figure 8:
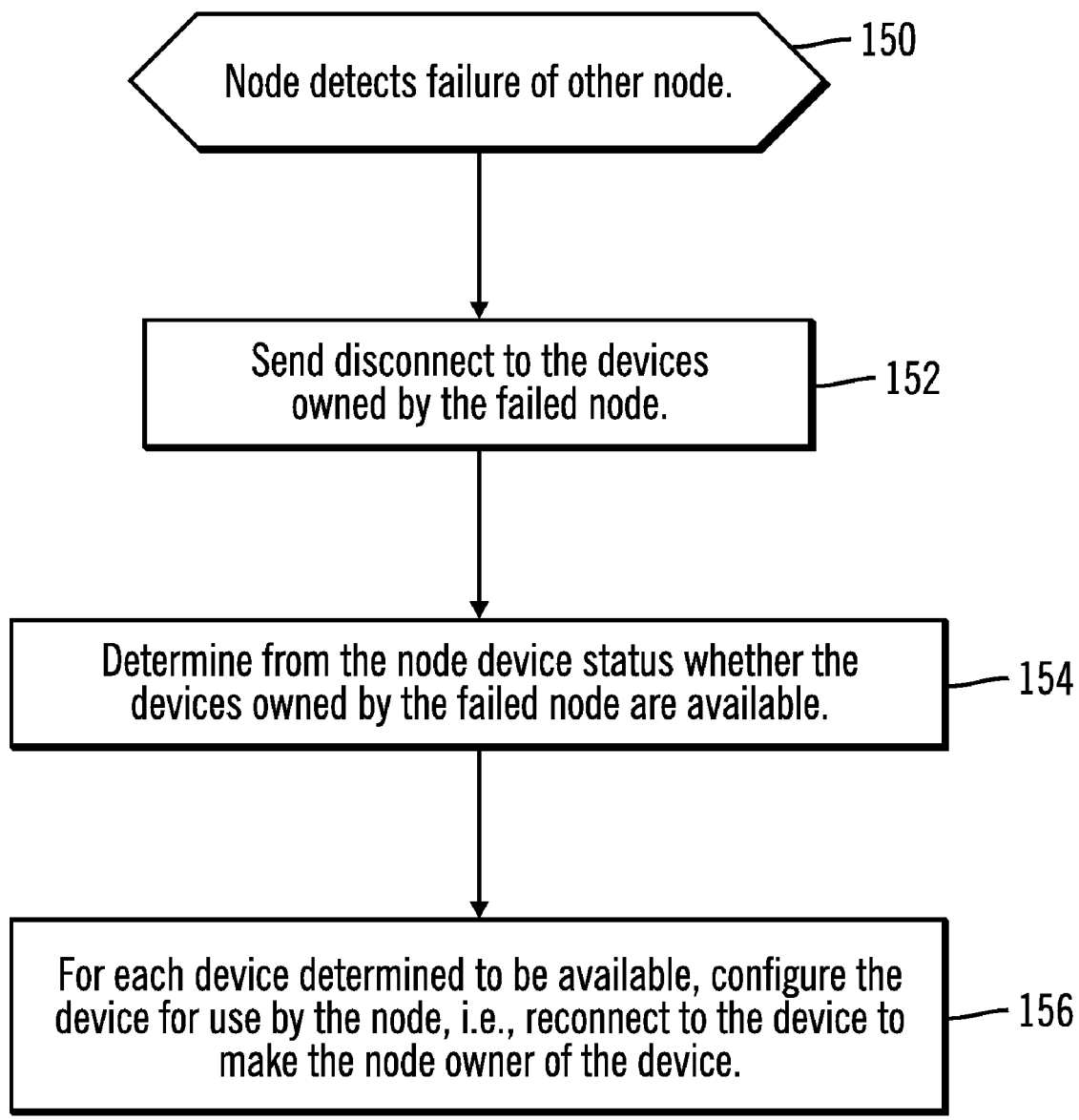
FIG. 8 illustrates an embodiment of a node operations to handle a takeover of a device assigned to a failed node.

FIG. 8 illustrates an embodiment of operations performed by the device manager 22 in a node 6a, 6b . . . 6n detecting (at block 150) a failure of one of the other nodes. The device manager 22 of the node 2a, 2b . . . 2m detecting a failed or failing node may send a disconnect command (at block 152) to the shared device 6a, 6b . . . 6n owned by the failing/failed node 2a, 2b . . . 2m. The disconnect command would cause the shared device 6a, 6b . . . 6n receiving the disconnect command to stop processing device requests from the node 2a, 2b . . . 2m until a subsequent reconnect is received. The device manager 22 determines (at block 154) from the node device status entries 24 whether the devices 6a, 6b . . . 6n owned by the failed node are available. For each device 6a, 6b . . . 6n owned by the failed/failing node determined to be available, the device manager 22 configures (at block 156) the device 6a, 6b . . . 6n for use by the node detecting the failure. In one embodiment, the device manager 22 may configure the device previously assigned to the failed node by issuing a reconnect command to reconnect to the node 2a, 2b . . . 2m detecting the failure.

If there are multiple surviving node 2a, 2b . . . 2m detecting the failed node 2a, 2b . . . 2m, then each of the survivor nodes may attempt to claim ownership of the devices 6a, 6b . . . 6n owned by the failed node 2a, 2b . . . 2m, and the first detecting node reconnecting and claiming the ownership may be the owner, i.e., a race condition. Alternatively, other techniques may be used to arbitrate among multiple surviving node 2a, 2b . . . 2m detecting a failure of a node and performing the operations of FIG. 8 to take over ownership of the devices owned by the failed node.

In one embodiment, a node may perform the operations of FIG. 8 to take over the device 6a, 6b . . . 6n previously managed by the failed/failing node after one or more of the devices 6a, 6b . . . 6n owned by the node fails. In such case, the node 2a, 2b . . . 2m taking over ownership would use status information sent from the failed device it owns before the device failure occurred. In an alternative embodiment, a node may perform the operations in FIG. 8 to take over a device managed by the failed node even if the devices owned by the node are still operational. In this way, a node may take over devices of a failed node to control more devices to improve workload balancing.

Figure 9:
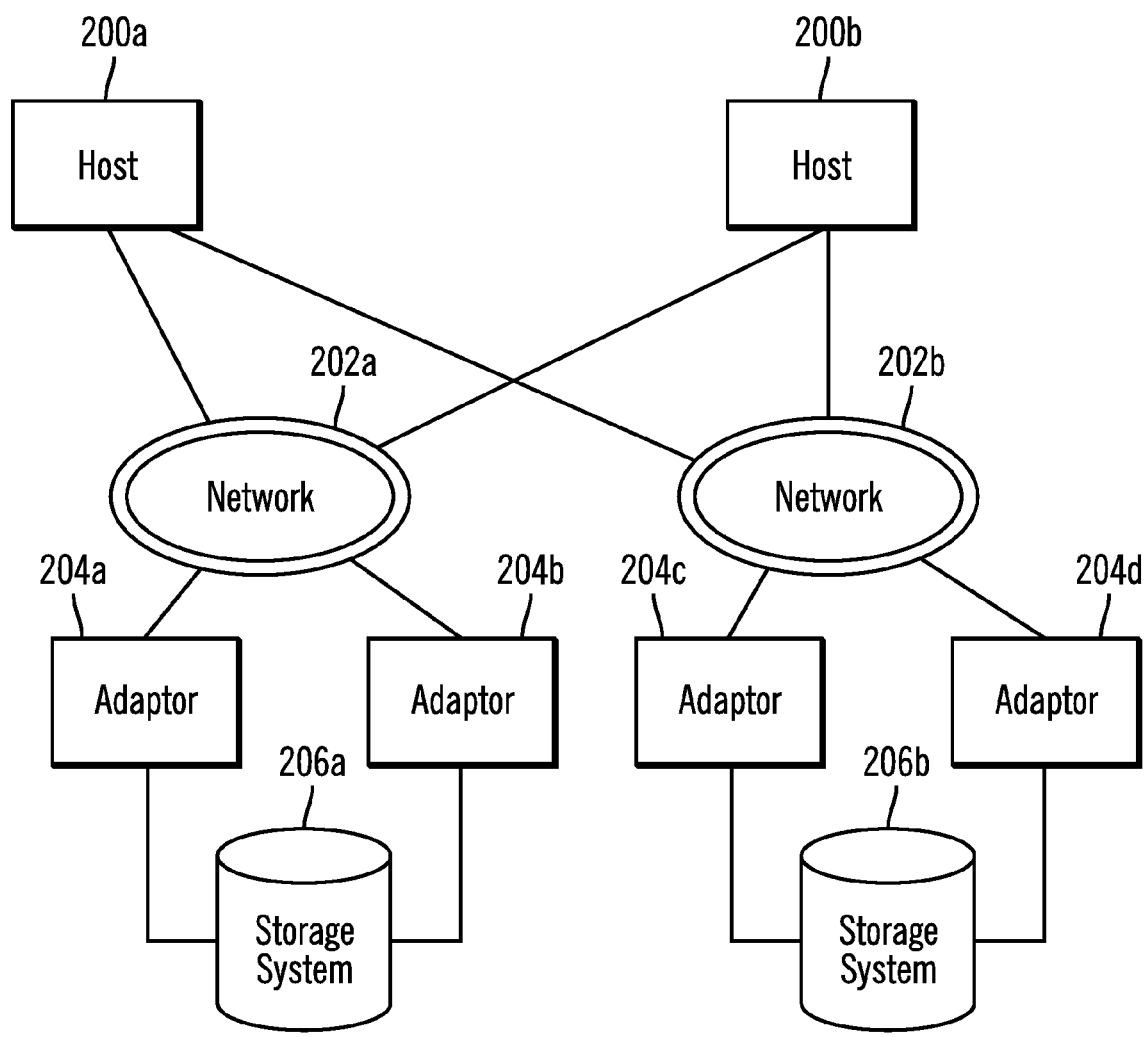
FIG. 9 illustrates a further embodiment of a storage system environment.

FIG. 9 illustrates an embodiment where the nodes comprise hosts 200a, 200b, each connected to networks 202a, 202b, which may comprise loop networks such as a Fibre Channel Arbitrated Loops. In FIG. 9, the devices comprise adapters 204a, 204b, 204c, 204d, where the adapters 204a and 204b and 204c and 204d on the different networks 202a and 202b, respectively, provide access to different storage systems 206a and 206b, respectively. In one embodiment, the storage systems 206a, 206b may comprise Redundant Array of Independent Disk (RAID) systems and the adapters 204a, 204b, 204c, 204d may comprise RAID controllers. The hosts 200a, 200b may comprise logical partitions or other processing unit types known in the art that may be included in a same system or different systems. The storage systems 206a, 206b may alternatively comprise other non-volatile storage systems known in the art, such as one or more interconnected hard disk drives, a tape library, optical library, a Direct Access Storage Device (DASD), Just a Bunch of Disks (JBOD), etc.

The hosts 200a, 200b may perform the operations of FIG. 7 with respect to both networks 202a, 202b to determine the status of all adapters 206a, 206b, 206c, 206d on the networks 202a, 202b to which the hosts 200a, 200b connect. Further, each adapter 206a, 206b, 206c, 206d may perform the operations of FIG. 6 to determine the status of other adapters on the same network 202a, 202b as the inquiring adapter 206a, 206b, 206c, 206d. The hosts 200a, 200b may perform the operations of FIG. 8 to take over ownership of an adapter owned by a failed/failing host 200a, 200b on the networks 202a, 202b to which the failed/failing host connects.

Described embodiments provide techniques for a node to take over use or ownership of devices managed by a failed or failing node by using status information from the devices the surviving node owns or uses. The nodes may use this status information when one of the nodes fails to determine whether the status of the devices assigned to the failed/failing node are available for takeover or reassignment to the surviving node.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The use of variable references, such as "n" or "m", etc., to denote a number of instances of an item may refer to any integer number of instances of the item, where different variables may comprise the same number or different numbers. Further, a same variable reference used with different elements may denote a same or different number of instances of those elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

communicating, by a first processing unit, with a second processing unit;

using, by the first processing unit, a first device accessible to both the first and second processing units;

using, by the second processing unit, a second device accessible to both the first and second processing units;

querying, by the first device, the second device to determine status on whether the second device is available or unavailable;

receiving, by the first processing unit, the determined status on the second device from the first device indicating whether the second device is available or unavailable;

detecting, by the first processing unit, a failure of the second processing unit;

determining, by the first processing unit, from the received determined status on the second device whether the second device is available in response to detecting the failure of the second processing unit; and configuring, by the first processing unit, the second device for use by the first processing unit in response to determining that the received determined status on the second device indicates that the second device is available and in response to detecting the failure.

2. The method of claim 1, further comprising:
querying, by the second device, the first device to determine status on whether the first device is available or unavailable;
receiving, by the second processing unit, the determined status on the first device from the second device indicating whether the first device is available or unavailable;
detecting, by the second processing unit, a failure of the first processing unit;
determining, by the second processing unit, from the received determined status on the first device whether the first device is available; and
configuring, by the second processing unit, the first device for use by the second processing unit in response to determining that the received determined status on the first device indicates that the first device is available.

3. The method of claim 1, wherein the first and second processing units and first and second devices communicate with each other over a common network.

4. The method of claim 1, wherein the first processing unit performs the determining from the received status on the second device whether the second device is available and the configuring of the second device for use in response to detecting a failure of the first device.

5. The method of claim 1, further comprising:
sending a disconnect to the second device used by the second processing unit in response to detecting the failure of the second processing unit to stop processing requests from the second processing units, wherein the configuring, by the first processing unit, of the second device for use by the first processing unit comprises a reconnect operation that is performed following the sending of the disconnect to the second device.

6. The method of claim 1 wherein the first device periodically performs the querying of the second device to determine whether the second device is available or unavailable; and
periodically querying, by the second device, the first device to determine whether the first device is available or unavailable.

7. The method of claim 1, wherein the first and second processing units comprises first and second hosts, wherein the first and second devices comprise first and second adapters, wherein the first and second adapters provide access to a storage system, and wherein the first and second adapters and the first and second hosts communicate over a network.

8. A method, comprising:
communicating, by a first processing unit, with a second processing unit;
using, by the first processing unit, a first device accessible to both the first and second processing units;
using, by the second processing unit, a second device accessible to both the first and second processing units;
periodically querying, by the first processing unit, the first device to determine whether the second device is available or unavailable; and
periodically querying, by the second processing unit, the second device to determine whether the first device is available or unavailable;
receiving, by the first processing unit, status on the second device from the first device indicating whether the second device is available or unavailable;
detecting, by the first processing unit, a failure of the second processing unit;
determining, by the first processing unit, from the received status on the second device whether the second device is available in response to detecting the failure of the second processing unit; and
configuring, by the first processing unit, the second device for use by the first processing unit in response to determining that the received status on the second device indicates that the second device is available and in response to detecting the failure.

9. A method, comprising:
communicating, by a first host, with a second host;
using, by the first host, a first adaptor accessible to both the first and second hosts;
using, by the second host, a second adaptor accessible to both the first and second hosts, wherein the first and second adaptors provide access to a first storage system, wherein the first and second adaptors and the first and second hosts communicate over a first network;
receiving, by the first host, status on the second adaptor from the first adaptor indicating whether the second adaptor is available or unavailable;
detecting, by the first host, a failure of the second adaptor;
determining, by the first host, from the received status on the second adaptor, whether the second adaptor is available in response to detecting the failure of the second host;
configuring, by the first host, the second adaptor for use by the first host in response to determining that the received status on the second adaptor indicates that the second adaptor is available and in response to detecting the failure;
communicating, by the first and second hosts, communicate with a third and fourth adapters over a second network;
providing, by the third and fourth adapters, access to a second storage system; and
using, by the first host, before detecting the failure of the second host, the first adapter to access the first storage system and the third adapter to access the second storage system and the second host uses the second adapter to access the first storage system and the fourth adapter to access the second storage system.

10. The method of claim 9, further comprising:
using, by the first host, the third adapter to access the second storage system before detecting the failure of the second host;
using, by the second host, the fourth adapter to access the second storage system before detecting the failure of the second host;
receiving, by the first host, status on the fourth adapter from the third adapter indicating whether the fourth adapter is available or unavailable;
determining, by the first host, from the received status on the fourth adapter whether the fourth adapter is available in response to detecting the failure of the second host; and
configuring, by the first host unit, the fourth adapter for use by the first host in response to determining that the received status on the fourth adapter indicates that the fourth adapter is available and in response to detecting the failure.

11. A system, comprising:
a first processing unit;
a second processing unit;
a first device used by the first processing unit and accessible to both the first and second processing units;
a second device used by the second processing unit and accessible to both the first and second processing units;
wherein the first device performs querying the second device to determine status on whether the second device is available or unavailable;

wherein the first processing unit performs operations, the operations comprising:
receiving the determined status on the second device from the first device indicating whether the second device is available or unavailable;
detecting a failure of the second processing unit;
determining from the received determined status on the second device whether the second device is available in response to detecting the failure of the second processing unit; and
configuring the second device for use by the first processing unit in response to determining that the received determined status on the second device indicates that the second device is available and in response to detecting the failure.

12. The system of claim 11,
wherein the second device performs querying of the first device to determine status on whether the first device is available or unavailable;
wherein the second processing unit performs operations, the operations comprising:
receiving the determined status on the first device from the second device indicating whether the first device is available or unavailable;
detecting a failure of the first processing unit;
determining from the received determined status on the first device whether the first device is available; and
configuring the first device for use by the second processing unit in response to determining that the received determined status on the first device indicates that the first device is available.

13. The system of claim 11, wherein the first processing unit performs the determining from the received status on the second device whether the second device is available and the configuring of the second device for use in response to detecting a failure of the first device.

14. The system of claim 11, wherein the first device periodically queries the second device to determine whether the second device is available or unavailable, and wherein the second device periodically queries the first device to determine whether the first device is available or unavailable.

15. A system, comprising:
a first processing unit;
a second processing unit;
a first device used by the first processing unit and accessible to both the first and second processing units;
a second device used by the second processing unit and accessible to both the first and second processing units;
wherein the first processing unit further performs:
periodically querying the first device to determine whether the second device is available or unavailable;
receiving status on the second device from the first device indicating whether the second device is available or unavailable;
detecting a failure of the second processing unit;
determining from the received status on the second device whether the second device is available in response to detecting the failure of the second processing unit; and
configuring the second device for use by the first processing unit in response to determining that the received status on the second device indicates that the second device is available and in response to detecting the failure; and
wherein the second processing unit further periodically queries the second device to determine whether the first device is available or unavailable.

16. An article of manufacture comprising a computer readable storage medium including code executed by a first processing unit and a first device, wherein the first processing unit and a second processing unit are in communication with each other and with first and second devices, wherein the first processing unit uses the first device and wherein the second processing unit uses the second device, wherein the code causes the first processing unit and the first device to perform operations, the operations comprising:
querying, by the first device, the second device to determine status on whether the second device is available or unavailable;
receiving, by the first processing unit, the determined status on the second device from the first device indicating whether the second device is available or unavailable;
detecting, by the first processing unit, a failure of the second processing unit;
determining, by the first processing unit, from the received determined status on the second device whether the second device is available in response to detecting the failure of the second processing unit; and
configuring, by the first processing unit, the second device for use by the first processing unit in response to determining that the received determined status on the second device indicates that the second device is available and in response to detecting the failure.

17. The article of manufacture of claim 16, wherein the code is further executed by the second processing unit and the second device to perform operations, the operations comprising:
querying, by the second device, the first device to determine status on whether the first device is available or unavailable;
receiving, by the second processing unit, status on the first device from the second device indicating whether the first device is available or unavailable;
detecting, by the second processing unit, a failure of the first processing unit;
determining, by the second processing unit, from the received status on the first device whether the first device is available; and
configuring, by the second processing unit, the first device for use by the second processing unit in response to determining that the received status on the first device indicates that the first device is available.

18. The article of manufacture of claim 16, wherein the first processing unit performs the determining from the received status on the second device whether the second device is available following a failure of the first device and the configuring of the second device for use in response to detecting a failure of the first device.

19. The article of manufacture of claim 16, wherein the first device periodically performs the querying of the second device to determine whether the second device is available or unavailable, and wherein the second device periodically queries the first device to determine whether the first device is available or unavailable.

20. An article of manufacture comprising a computer readable storage medium including code executed by a first and second processing units, wherein the first and second processing units are in communication with each other and with first and second devices, wherein the first processing unit uses the first device and wherein the second processing unit uses the second device, wherein the code causes the first and second processing units to perform operations, the operations comprising:

periodically querying, by the first processing unit, the first device to determine whether the second device is available or unavailable; and periodically querying, by the second processing unit, the second device to determine whether the first device is available or unavailable;

receiving, by the first processing unit, status on the second device from the first device indicating whether the second device is available or unavailable;

detecting, by the first processing unit, a failure of the second processing unit;

determining, by the first processing unit, from the received status on the second device whether the second device is available in response to detecting the failure of the second processing unit; and configuring, by the first processing unit, the second device for use by the first processing unit in response to determining that the received status on the second device indicates that the second device is available and in response to detecting the failure.

* * * * *